(12) United States Patent
Luo

(10) Patent No.: US 7,437,361 B2
(45) Date of Patent: Oct. 14, 2008

(54) USE OF RETRY PERIOD IN AN APPLICATION SERVER TO ENSURE THAT STATUS INFORMATION IS SENT FROM FIRST TO SECOND DATABASE INSTANCE

(75) Inventor: Fei Luo, Bedmister, NJ (US)

(73) Assignee: BEA Systems, Inc., San Jose, CA (US)

( * ) Notice: Subject to any disclaimer, the term of this patent is extended or adjusted under 35 U.S.C. 154(b) by 0 days.

(21) Appl. No.: 11/105,949

(22) Filed: Apr. 14, 2005

(65) Prior Publication Data
US 2006/0235853 A1  Oct. 19, 2006

(51) Int. Cl.
*G06F 17/30* (2006.01)
(52) U.S. Cl. .................. 707/8; 707/9; 707/10; 707/203
(58) Field of Classification Search ...................... 707/1, 707/10, 203, 8, 9; 709/220, 223; 710/1; 713/202; 718/101; 719/332
See application file for complete search history.

(56) References Cited

U.S. PATENT DOCUMENTS

| 6,523,036 B1 * | 2/2003 | Hickman et al. ............... 707/10 |
| 6,941,310 B2 * | 9/2005 | Ahad et al. .................. 707/100 |
| 7,403,945 B2 * | 7/2008 | Lin et al. ........................ 707/8 |
| 2004/0078495 A1 * | 4/2004 | Mousseau et al. .............. 710/1 |
| 2005/0021688 A1 * | 1/2005 | Felts et al. ................... 709/220 |

OTHER PUBLICATIONS

Wang, Yi-Min et al., "Progressive retry for software failure recovery in message-passing applications", IEEE Transactions on Computers, vol. 46, Issue 10, Oct. 1997, pp. 1137-1141.*

* cited by examiner

*Primary Examiner*—Shahid A Alam
(74) *Attorney, Agent, or Firm*—Fliesler Meyer LLP

(57) ABSTRACT

A retry period can be used in a system that uses a first and second database instance to ensure that the status information from the first database instances has been transferred and updated at the second databases instance.

20 Claims, 7 Drawing Sheets

USE OF RETRY PERIOD IN AN APPLICATION SERVER TO ENSURE THAT STATUS INFORMATION IS SENT FROM FIRST TO SECOND DATABASE INSTANCE

BACKGROUND OF INVENTION

Application servers, such as the WebLogic™ Server available from BEA Systems of San Jose, Calif., allow users to do a number of functions. One of the functions typically supported by application servers is to provide access to a database. In one embodiment, a connection pool such as a Java Database Connectivity (JDBC) connection pool is provided by the application server. The connection pool provides a number of previously prepared connections with a database. These connections are provided to applications of the application server as needed. Such connection pools allow for a relatively large number of applications in the application server to access a database while reducing the database connection time for the application. When the database is a high availability database, it can have a number of database instances containing the information of the database.

DETAILED DESCRIPTION

Figure 1:
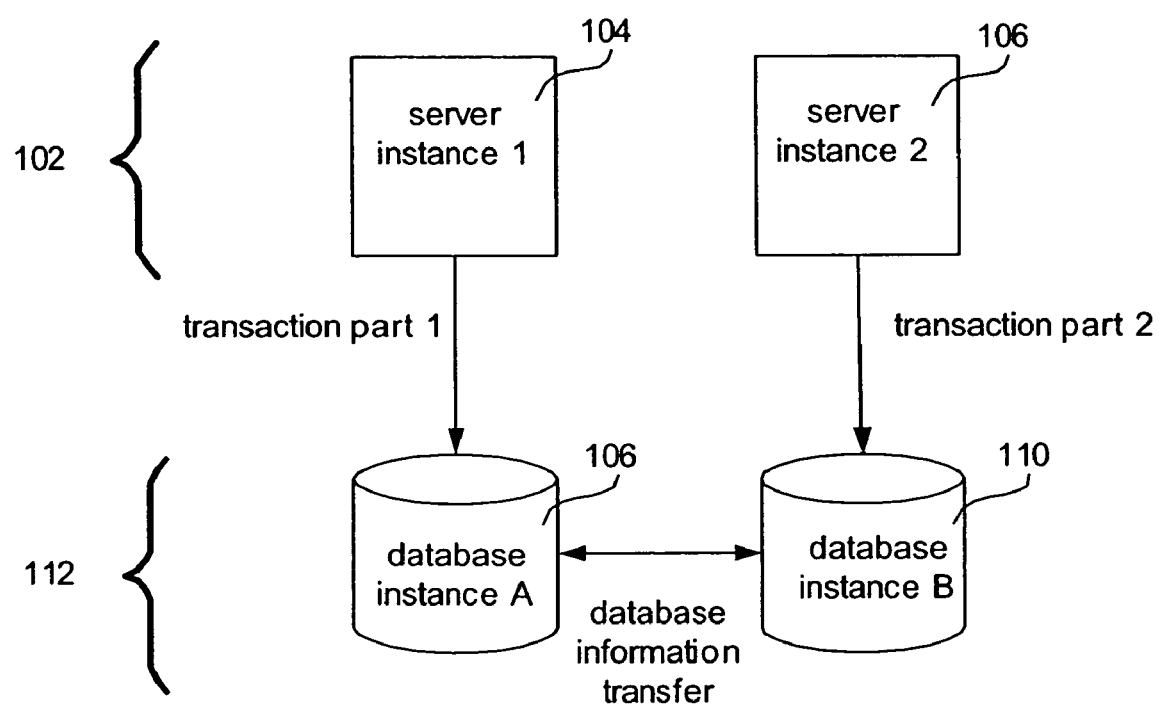
FIG. 1 is a diagram illustrating a global transaction with parts being sent to different database instances.

Use Of Transaction Context To Select Single Database Instance For Global Transaction FIG. 1 illustrates a situation where an application server 102 includes server instances 104 and 106 interacting with database instances 108 and 110. A global transacting having multiple parts, such as transaction part 1 and transaction part 2 can be sent to different database instances of the high availability database 112. A problem that can occur when failover or load balancing is that parts of a global transaction can be routed to different database instances. A failure at one of the databases instances can cause a data loss or data locking. Additionally, one half of a transaction can commit while the other half of the transaction does not commit.

Figure 2:
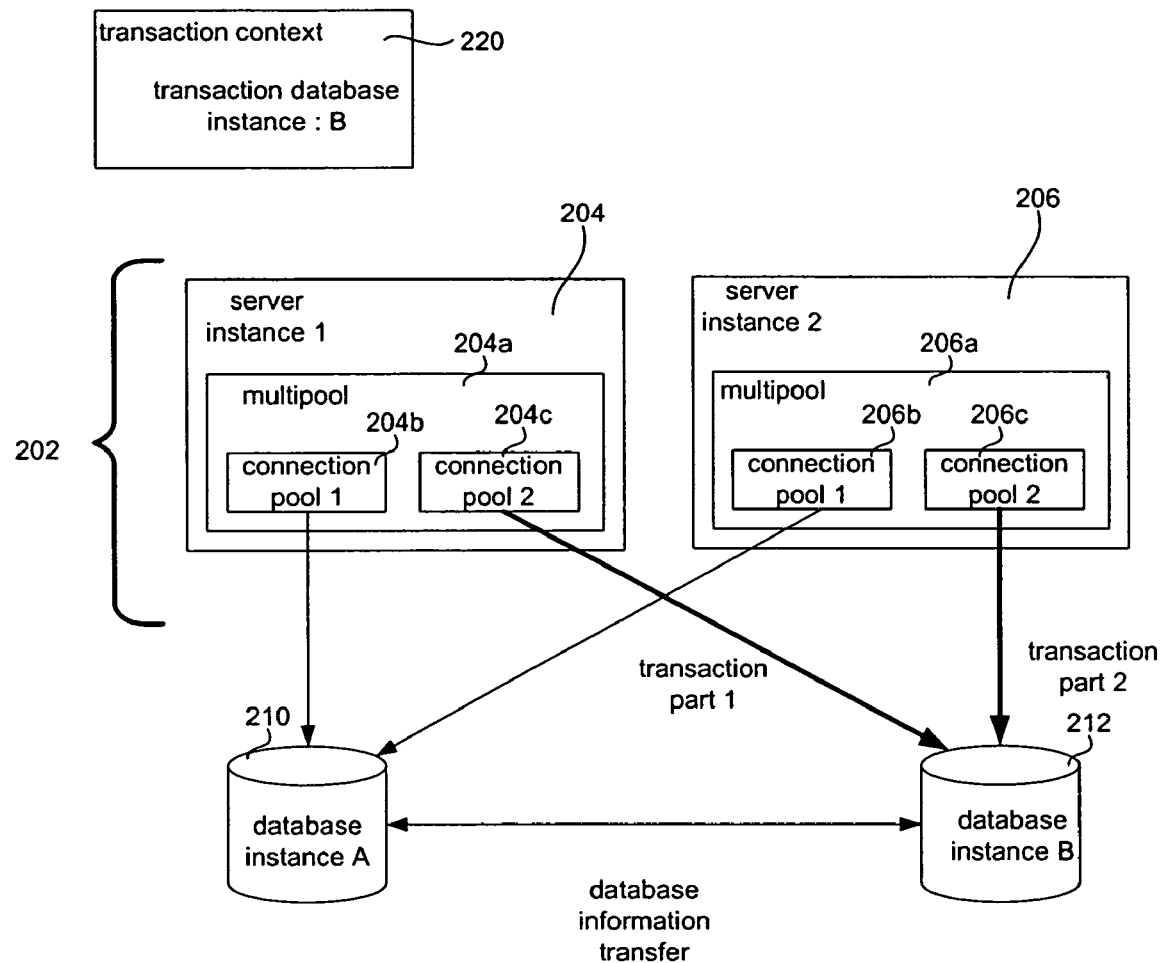
FIG. 2 is a diagram illustrating the use of a transaction context to ensure multiple transaction parts are sent to the same database instance.

FIG. 2 illustrates the use of a transaction context that designates a single database instance for a global transaction. The transaction context can be available on different server instances.

One embodiment of the present invention is a server system 202 comprising a number of server instances 204 and 206. The server instances can interact with a number of database instances 210 and 212. The server instances 204 and 206 can have access to a shared transaction context 220 for a global transaction. The transaction context 220 indicating a single database instance 212 for the global transaction, Each server instance 204 and 206 that connects to a database instance for the global transaction can connect to the single database instance.

The transaction context 220 can be available to all of the server instances, such as server instances 204 and 206. A transaction context can be maintained for each global transaction to be done. In the example of FIG. 2, the transaction context 220 can be checked to ensure that a single database instance is used, in this case database instance 212. This prevents problems that can occur when portions of the transaction are sent to two different database instances. In one embodiment, the global transaction is a twophase commit transaction, such as an XA transaction.

In this example, each of the server instances 204 and 206 have multipools 204*a* and 206*a*. The multipools include a connection pools, such as connection pools 204*b*, 204*c*, 206*b*, 206*c*. The connection pools can be used for connecting to the database instances. The server instances can be applications servers, such as an application server used database connected to the system, such as those that use a connection pools and multipools.

Examples of a transaction context that can be expanded to include an indication of the single database instance is the transaction context described in the JAVA transaction API (JTA) incorporated herein by reference.

One embodiment of the present invention is a server system comprising a number of server instances. The server instances can interact with a number of database instances. The server instances can include at least one multipool. The at least one multipool can include connection pools for connecting to the database instances. The server instances can have access to a shared transaction context for a global transaction. The transaction context can indicate a single database instance for the global transaction. Each server instance that connects to a database instance for the global transaction can connect to the single database instance.

One embodiment of the present invention is a java database connectivity system comprising a multipool including a number of connection pools to connect to database instances. In a global transaction, the multipool can check a shared transaction context. The transaction context can be a software object that can be shared by multipools at different server instances. The transaction context can indicate a single database instance for the global transaction. The multipool can connect to the single database instance indicated by the transaction context.

Use Of Retry Period In An Application Server To Ensure That Status Information Is Sent From First To Second Database Instance In number situations when multiple databases are used, the application server needs to make sure that the most recent status information has been transferred from a first database instance to a second database instance. This is especially the case when a failure occurs at a database instance. One way of doing this is to use a retry periods as described below.

Figure 3:
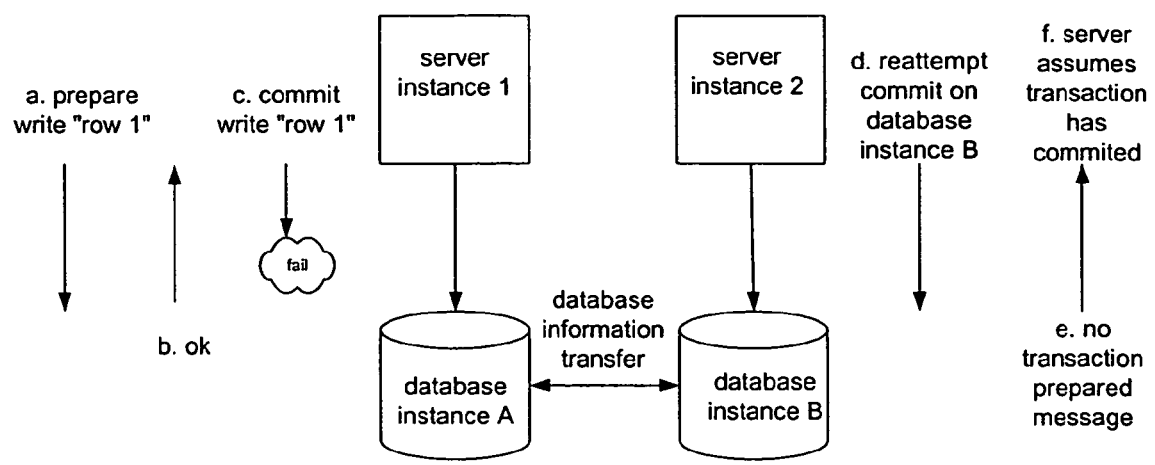
FIGS. 3-5 illustrate problems that can occur if status information is not updated between two different database instances before information is request by the application server.
Figure 4:
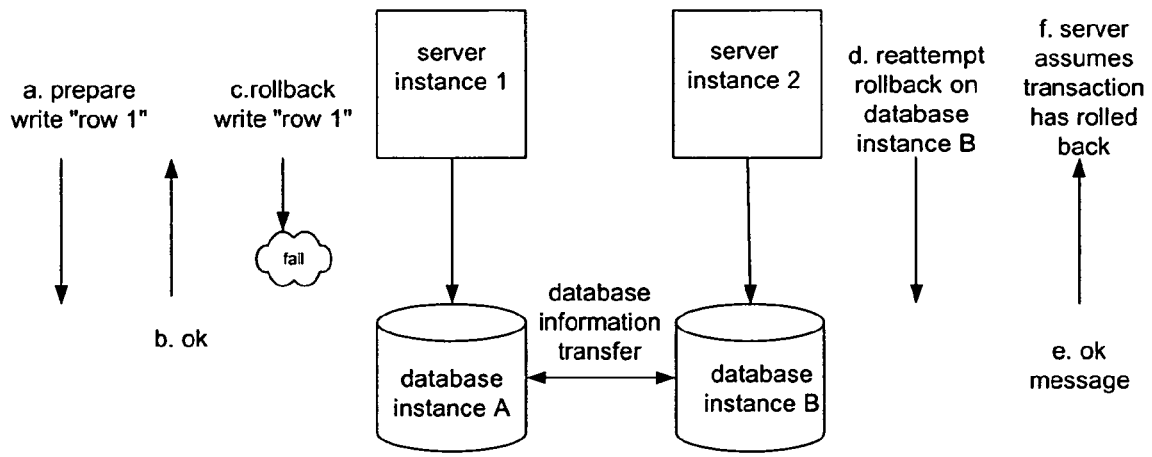
Figure 5:
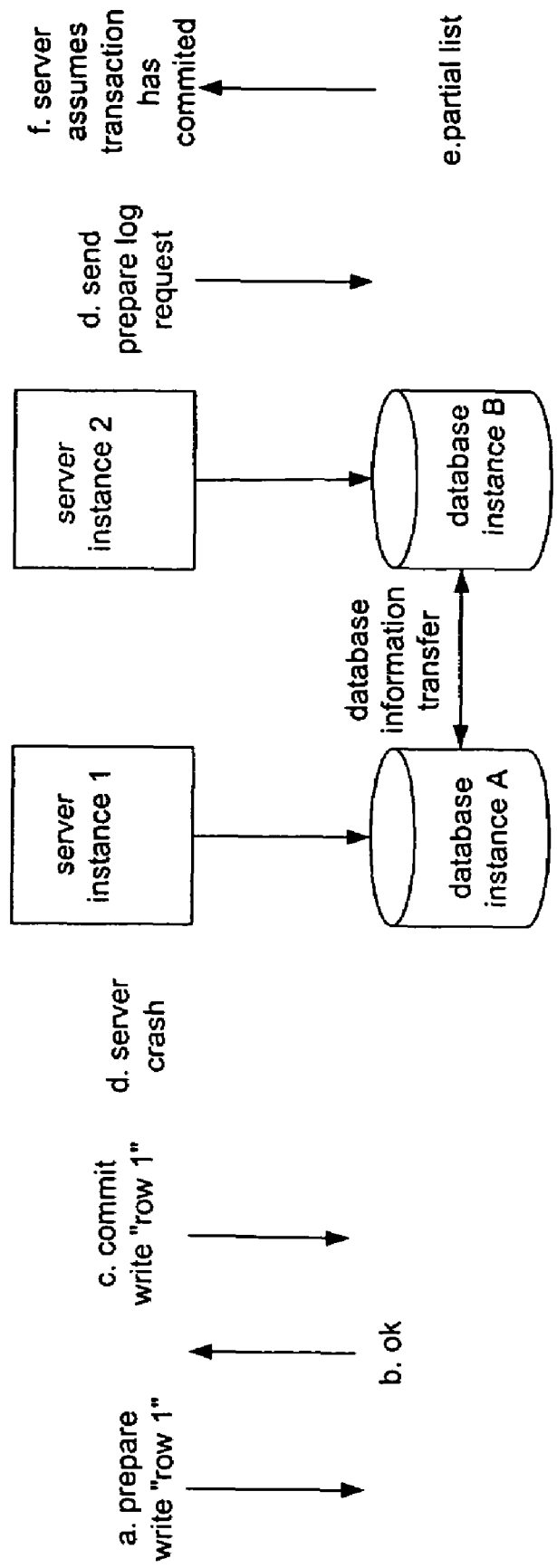

FIGS. 3-5 illustrate examples where problems may occur. FIG. 3 illustrates a case in which a commit failure can cause problems. In step A, a prepare is sent such as the prepare to write row 1. The database instance A responds with an OK signal. The server instance then responds with a commit to write row 1. If this commit fails, later, a reattempt can be done to a separate database instance. If the database status information hasn't been transferred from database instance A to database instance B, the reattempt of the commit to database instance D can result in a signal from database instance B that database instance B has no transaction prepared for the identifying information. The application server can misinterpret this response as an indication that the transaction has committed. Since the database may not store transaction info for transactions that have committed, the "No transaction Prepared" signal would be sent if the transaction would have committed. In one example, an Oracle database may send an XA_NOTA signal, which the application server can mistakenly interpret as an indication that the transaction committed.

FIG. 4 illustrates a similar case upon a failure of a rollback. In this case, if the database instance B is not updated with the most recent prepare information, upon a rollback, the database instance B may send back an OK message. The application server may then assume that the transaction has been rolled back, when in fact, the prepare status information hasn't been updated in the database instance B.

FIG. 5 illustrates an additional problem, if upon a server recovery, an application server sends a log request to the database instance and the database instance does not have the most recent information, the database instance will return partial log information that is insufficient for the application server to properly rollback.

In one embodiment of the present invention, a server system comprises at least one server instance interacting with a number of database instances 608 and 610. The at least one server instance has an associated retry period for situations when a connection with a first database instance 608 fails in an transaction and a connection is made to finish the transaction at a second database instance 610. The associated retry period is used to ensure that the most recent status information for the transaction has been sent from the first database instance 608 to the second database instance 610.

The transaction can be a two phase transaction such as an XA transaction. In one embodiment, shown in FIG. 6, after the commit fails into the database instance 608 a commit is repeated at the database instance 610 for the retry period when the response from the second database instance is such that the second database instance may not have been updated with the most recent status information. For example, when a "no prepared transaction" message is received from the database instance 610. A retry is not required when the signal from the database instance is such that it is clear that the database instance has processed most recent status information. from the first database instance. For example if the second database instance indicates that it has just committed in response to the commit reattempt no retry is needed.

Figure 6:
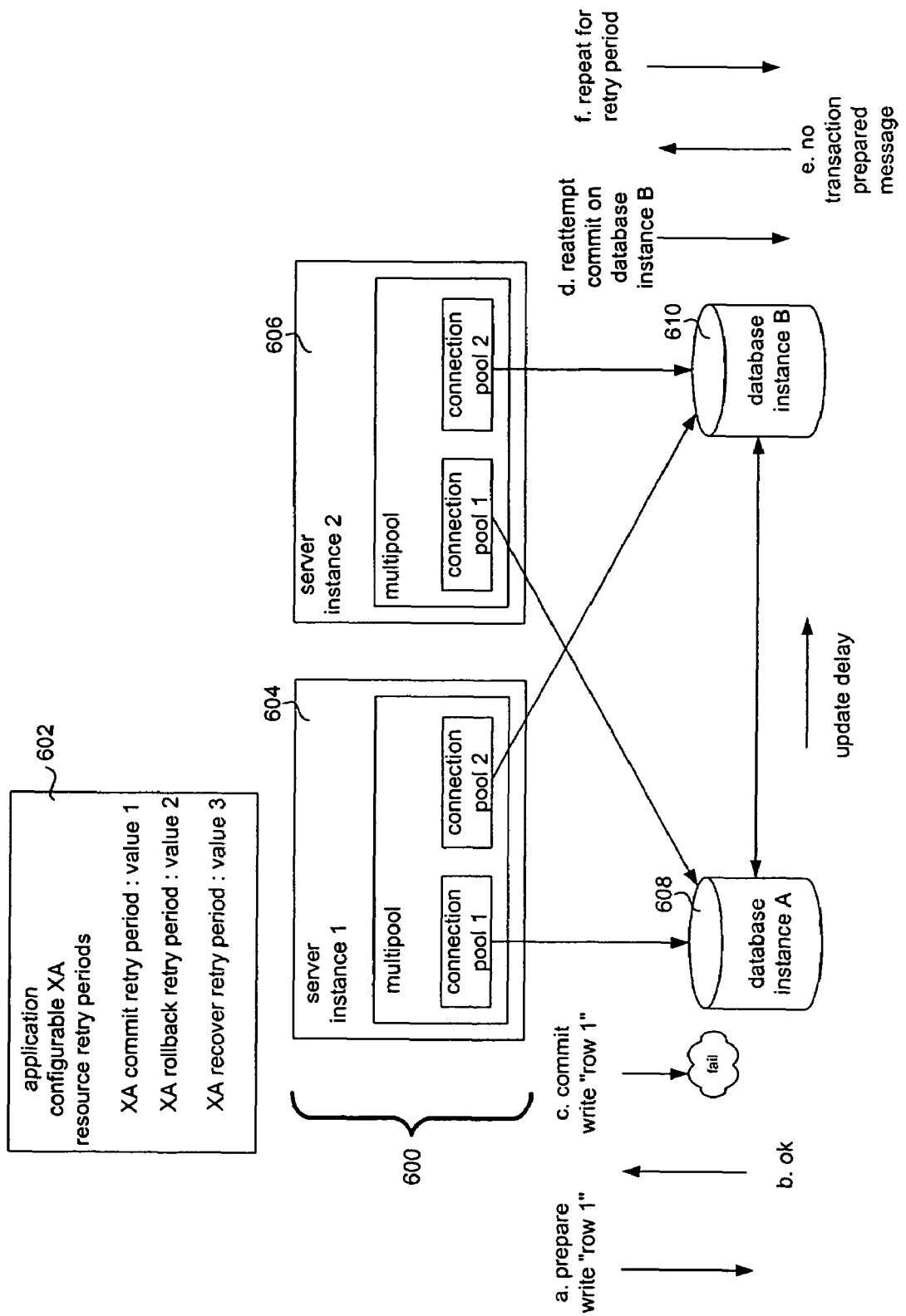
FIG. 6 is a diagram illustrating the use of a retry period to retry after a commit fails.

The example of FIG. 6, shows separate retry periods: a commit retry period, a rollback retry period and a recovery retry period. Alternately, a single retry period can be used for the commit, retry and recovery. The retry period can be set so that it is at least as long as the combination of the transaction time for one database instance to transfer the update information to the other database instances and the processing time for the other database instances to update after receiving the update information. The retry period can be configurable with or without a default value. Alternately, the retry period can be preset and non-configurable.

Figure 7:
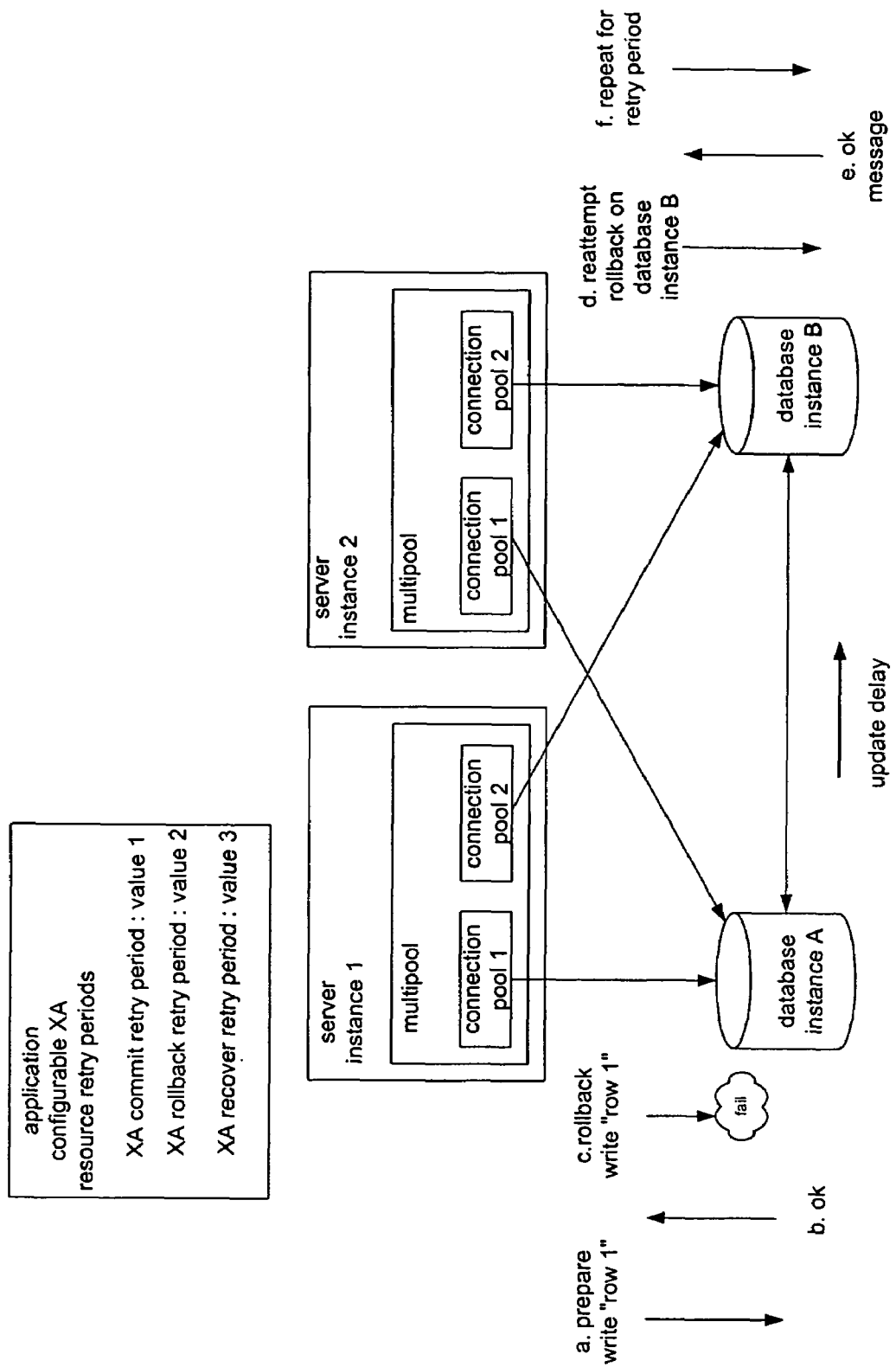
FIG. 7 is a diagram illustrating the use of a retry period after a rollback fails.

FIG. 7 illustrates a rollback embodiment. If an OK message is received from the database instance B after a first reattempt to rollback on the database instance B, the application server can repeat for the retry period. The OK signal is ambiguous because it can mean that the transaction was rolled back by the first database instance and the second database instance has received a status update from the first database instance to this effect; or it can mean the second database instance has not even received a status update from the first database instance for the prepare. The rollback to the second database instance B can be repeated within the retry period when the response from the second database instance can be such that the second database instance might be updated with the most recent status information.

Figure 8:
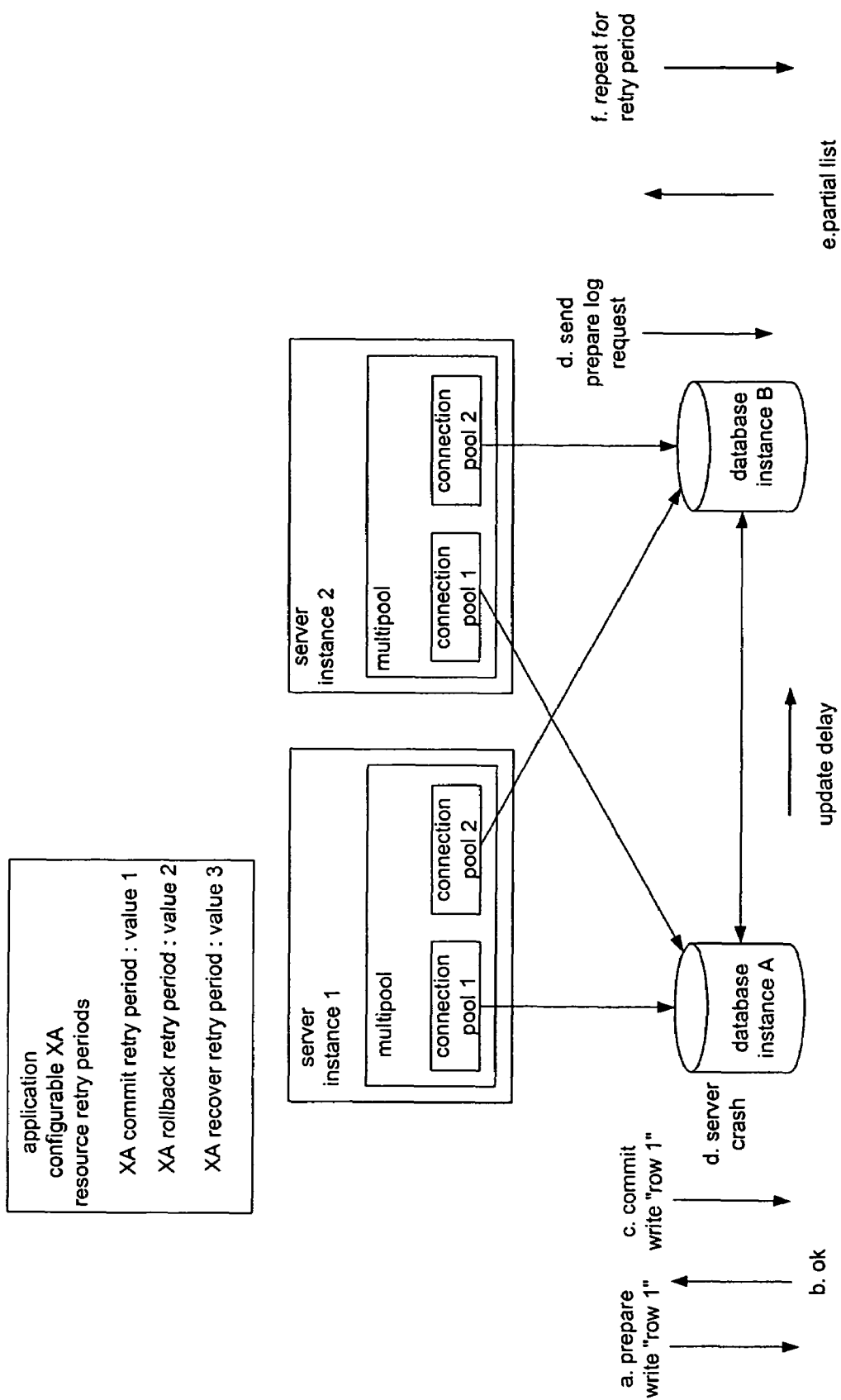
FIG. 8 is a diagram illustrating the use of a retry period for recovery.

FIG. 8 illustrates a case in which the application server retries a request to the second database instance for a recovery log during a retry period. If it is possible that the recovery log from the second database instance is a partial one, then the application server can retry during or at the end of a retry period.

One embodiment of the present invention is a java database connectivity system wherein an associated retry period is used for situations when a connection with a first database instance fails in an transaction and a connection is made to finish the transaction at a second database instance, the associated retry period being used to ensure that the most recent status information for the transaction has been sent from the first database instance to the second database instance.

Detailed Description Of One Non-Limiting Example

The following description gives one non-limiting implementation of the present invention. The discussion below gives one embodiment, but those skilled in the art will understand that other implementations of the above-described concepts can be done. Any potentially limiting language given below is to be interpreted in the context of the specific non-limiting implementation and is not meant to limit the general concept.

The following non-limiting implementation describes an embodiment using a high availability Oracle database with multiple databases instances. It would be understood that other databases systems with multiple database instances may have similar problems, which can be fixed by the system of the present invention.

Standalone JDBC Test Cases Where Used To Investigate The Oracle RAC's Non-Documented XA Behaviors. Two Critical Oracle RAC XA Behaviors Are Identified:
  Oracle RAC XA Behavior #1: All unprepared database activities of a global transaction should be routed to the same Oracle RAC instance.
  Oracle RAC XA Behavior #2: Prepared global transactions should be committed or rolled back from other Oracle RAC instances, which is not the one that prepared the global transaction, ONLY after oracle session timeout.

Based On The Above Oracle RAC XA Behaviors, WLS JDBC/JTA XA Handling Logics Were Reviewed And The Following Problems Found:
  With Oracle driver level failover or load balance enabled, WLS JDBC connection pool may route database activities, of an unprepared global transaction, to different Oracle RAC instances. This can cause partial commit or rollback. Application may experience data loss and data locking problem.
  After a global transaction is prepared, WLS JTA will automatically do commit retry if first commit failed. Due to the Oracle RAC XA behavior #2, if retrying, against a different Oracle RAC instance, happens before Oracle session timeout, retry commit will get XA_NOTA. This will cause WLS JTA assume that the prepared transaction has already been committed. Therefore JTA may return a false commit success to the application. Application may experience data lose and data locking problem.
  After a global transaction is prepared and coordinator decide to roll back it, WLS JTA will automatically do rollback retry if first rollback failed. Due to the Oracle RAC XA behavior #2, if retrying, against a different Oracle RAC instance, happens before Oracle session timeout, retry rollback will get XA_OK even prepared transaction has not really been rolled back. This will cause WLS JTA assume that the pending transaction has been rolled back. Therefore JTA may return a false rollback success to the application. Application may experience data locking problem.

When WLS crashed and reboot, as part of recovery process WLS JTA will roll back those prepared transactions which has not reached the commit point in the previous run. Due to the Oracle RAC XA behavior #2, if rollback is issued, against a different Oracle RAC instance, before Oracle session timeout, rollback will get XA_OK even prepared transaction has not really been rolled back. This will cause WLS JTA assume that the pending transaction has been rolled back. Therefore JTA may get a false recovery. Application may experience data locking problem.

Based On The Observed Oracle RAC XA Behavior And The Problems We Found In WLS JDBC/JTA, We Propose The Following Solutions Are Possible:

Instead of Oracle driver level failover or load balance, WLS JDBC Multi-Pool should be used and enhanced to make sure all database activities of an unprepared global transaction will be routed to the same Oracle RAC instance.

WLS JDBC should be enhanced to identify the XA_NOTA caused by Oracle RAC XA behavior #2. Commit should be retried based on its TransactionTimeout value.

WLS JDBC should be enhanced to identify the false XA_OK caused by Oracle RAC XA behavior #2. Rollback should be retried based on its TransactionTimeout value.

WLS JTA should be enhanced to rerun the recovery process for a period of time based on a configured timeout value specified by the application.

Behaviors

Normal running condition:

For the same global transaction branch, prepare and commit/rollback must be issued to all participating RAC instances. For regular oracle instance, one and only one prepare and commit/rollback is needed no matter how many connections are involved in the same global transaction.

For the same global transaction branch, pending changes made on one RAC instance are invisible for other RAC instances. This is not the case for the regular Oracle instance with default TransactionIsolationLevel.

For the same global transaction branch, data locks acquired on one RAC instance are not sharable for other RAC instance. This is not the case for the regular Oracle instance with default TransactionIsolationLevel.

RAC instance crashed:

Unprepared transaction will be rolled back after Oracle session timeout.

Data locks acquired by an unprepared transaction will be released after Oracle session timeout.

Data locks acquired by a prepared transaction will be hold until that transaction is rolled back or committed.

Prepared transaction may be rolled back or committed from other RAC nodes ONLY after Oracle session timeout.

Oracle listener process crashed:

Existing connections continue to function properly.

New connection can not be established through the failed listener.

There is no direct impact on global transaction handling.

JDBC client lost connection to RAC instance:

Unprepared transaction will be rolled back after Oracle session timeout.

Data locks acquired by an unprepared transaction will be released after Oracle session timeout.

Data locks acquired by a prepared transaction will be hold until that transaction is rolled back or committed.

Prepared transaction may be rolled back or committed from other RAC nodes ONLY after Oracle session timeout.

RAC Instance Lost Connection To Each Other (Behavior Observed From A Two Node Oracle RAC Installation)

One node continues to function normally.

Another node stops working. Existing connections to this node are reset. No new connection can be established to this node. This node behaves like it is crashed or shut down.

Unprepared transaction on the stopped node will be rolled back after Oracle session timeout.

Data locks acquired by an unprepared transaction will be released after Oracle session timeout.

Prepared transactions on the stopped node can be rolled back or committed from the running node after Oracle session timeout.

Other Failure Cases

RAC instance lost connection to the shared storage system:

If an Oracle RAC instance lost its connection to the shared storage system, it will stop working. And we treat this failure case as the same as server crash.

RAC node crashed:

This can be a combination of RAC instance crash and listener crash. We are also aware of the possible hanging problem on the client side under this failure scenario. But we believe client hanging problem should be addressed by the JDBC driver vendors.

Problems

Normal Running Condition

Lose Part Of The Global Transaction

WLS JDBC Connection Pool "CP1" and TxDataSource "DS1" are deployed on a WLS cluster which has two WLS servers, "WLS1" and "WLS2". Connection Pool "CP1" is configured to use Oracle thin XA driver and point to Oracle 10g RAC nodes "RAC1" and "RAC2" with driver level load balance enabled. "keepXAConnTillTxComplete" flag is set to be true for "CP1".

Here is problematic scenario:

WLS1 . . . , start a new global transaction

WLS1 . . . , get a connection from "CP1" and connection points to RAC1

WLS1 --> RAC1, insert one record "row1" into a table through RAC1

WLS1 --> WLS2, invoke a EJB on WLS2

WLS2 . . . , inside EJB, get a connection from "CP1" and connection points to RAC2 (load balance is enabled)

WLS2 --> RAC2, inside EJB, insert another record "row2" into a table through RAC2

WLS1 . . . , commit the global transaction

Problem: Only "row1" will be inserted. "row2" is lost.

RAC Instance Crashed Or WLS JDBC Lost Connection To RAC Instance

Lose part of the global transaction:

WLS JDBC Connection Pool "CP1" and TxDataSource "DS1" are deployed on a WLS cluster which has two WLS servers, "WLS1" and "WLS2". Connection Pool "CP1" is configured to use Oracle thin XA driver and point to Oracle 10g RAC nodes "RAC1" and "RAC2" with driver level failover enabled. RAC1 is primary and RAC2 is secondary. "keepXAConnTillTxComplete" flag is set to be true for "CP1".

Here is problematic scenario:
- WLS1 . . . , start a new global transaction
- WLS1 . . . , get a connection from "CP1" and connection points to RAC1
- WLS1 --> RAC1, insert one record "row1" into a table through RAC1
- WLS1 --> WLS2, invoke a EJB on WLS2
- WLS2 lost its network connection to RAC1
- WLS2 . . . , inside EJB, get a connection from "CP1" and connection points to RAC2 (connection failover to RAC2)
- WLS2 --> RAC2, inside EJB, insert another record "row2" into a table through RAC2
- WLS1 . . . , commit the global transaction
  - Problem: Only "row1" will be inserted. "row2" is lost.

False Commit:

WLS JDBC Connection Pool "CP1" and TxDataSource "DS1" is deployed on a WLS server, "WLS1". Connection Pool "CP1" is configured to use Oracle thin XA driver and point to Oracle 10g RAC nodes "RAC1" and "RAC2" with driver level failover or load balance enabled. "keepXAConnTillTxComplete" flag is set to be true for "CP1".

Here is problematic scenario:
- WLS1 . . . , start a new global transaction
- WLS1 . . . , get a connection from "CP1" and connection points to RAC1
- WLS1 --> RAC1, insert one record "row1" into a table through RAC1
- WLS1 . . . , send a message to a queue
- WLS1 . . . , commit the global transaction
- WLS JTA internally will do
- WLS1 ----> JMS, ask JMS prepare the transaction
- WLS1 --> RAC1, ask RAC1 prepare the transaction
- WLS1 . . . , write entry into WLS TLOG
- WLS1 ----> JMS, ask JMS commit the transaction
- WLS1 lost its network connection to RAC1 or RAC1 crashed
- WLS1 --> RAC1, ask RAC1 commit the transaction, it fails with XAException
- WLS JTA will retry the commit, it will use a new XAResource object which points to RAC2
- WLS1 --> RAC2, ask RAC2 commit the transaction, before Oracle session timeout, it fails with XA_NOTA, WLS JTA assume that the prepared transaction has already been committed and return as commit success.
  - Problem: Transaction is not really committed but reported and recorded as committed. Transaction is still pending and data is still locked.

False Rollback:

WLS JDBC Connection Pool "CP1" and TxDataSource "DS1" is deployed on a WLS server, "WLS1". Connection Pool "CP1" is configured to use Oracle thin XA driver and point to Oracle 10g RAC nodes "RAC1" and "RAC2" with driver level failover or load balance enabled. "keepXAConnTillTxComplete" flag is set to be true for "CP1".

Here is problematic scenario:
- WLS1 . . . , start a new global transaction
- WLS1 . . . , get a connection from "CP1" and connection points to RAC1
- WLS1 --> RAC1, insert one record "row1" into a table through RAC1
- WLS1 . . . , send a message to a queue
- WLS1 . . . , commit the global transaction
- WLS JTA internally will do
- WLS1 --> RAC1, ask RAC1 prepare the transaction
- WLS1 ----> JMS, ask JMS prepare the transaction but it failed
- WLS JTA will roll back automatically
- WLS1 lost its network connection to RAC1 or RAC1 crash
- WLS1 --> RAC1, ask RAC1 rollback the transaction, it fails with XAException
- WLS JTA will retry the rollback, it will use a new XAResource object which points to RAC2
- WLS1 --> RAC2, ask RAC2 rollback the transaction, before Oracle session timeout, it returns XA_OK but it doesn't really rollback the transaction. But WLS JTA think transaction has been successfully rolled back.
  - Problem: Transaction is not really rolled back but reported as rolled back. Transaction is still pending and data is still locked.

WLS Server Crashed And RAC Instance Crashed Or WLS JDBC Lost Connection To RAC Instance False Recover Rollback WLS JDBC Connection Pool "CP1" and TxDataSource "DS1" is deployed on a WLS server, "WLS1". Connection Pool "CP1" is configured to use Oracle thin XA driver and point to Oracle 10g RAC nodes "RAC1" and "RAC2" with driver level failover or load balance enabled. "keepXAConnTillTxComplete" flag is set to be true for "CP1". Here is problematic scenario:
- WLS1 . . . , start a new global transaction
- WLS1 . . . , get a connection from "CP1" and connection points to RAC1
- WLS1 --> RAC1, insert one record "row1" into a table through RAC1
- WLS1 . . . , send a message to a queue
- WLS1 . . . , commit the global transaction
- WLS JTA internally will do
- WLS1 --> RAC1, ask RAC1 prepare the transaction
- WLS1 crash and reboot and WLS1 lost network connection to RAC1
- WLS JTA will issue recover process
- WLS1 JTA ------, get XAResource object pointing to RAC2
- WLS1 --> RAC2, WLS JTA will recover and rollback the pending transaction that is not logged in WLS TLOG. Before Oracle session timeout, oracle XAResource returns XA_OK but it doesn't really rollback the transaction. WLS JTA think pending transactions have been successfully rolled back.
  - Problem: Transactions have not been really rolled back. Transactions are still pending and data is still locked.

False Recover Commit:

WLS JTA recovery process will do commit retry on the transactions which have been committed but may not have been completed in the previous run. This scenario will have the same problem as I documented in 6.2.2.

Problem: Transactions Have not Been Really Committed. Transactions are Still Pending and Data is Still Locked. Solutions To These Problems Can Include The Following:

Instead of enabling Oracle driver level failover or load balance, WLS JDBC Multi-Pool can be used and enhanced to make sure all database activities of an unprepared global transaction will be routed to the same Oracle RAC instance.

WLS JDBC XAResource wrapper can be enhanced to recognize the XA_NOTA error caused by Oracle RAC XA behavior #2. It should instruct WLS JTA to continue retrying commit rather than treating it as committed. A retry timeout may be configured by the application to avoid unnecessary retry in real heuristic scenarios.

WLS JDBC XAResource wrapper can be enhanced to recognize the false XA_OK caused by Oracle RAC XA behavior #2. It can instruct WLS JTA to continue retrying rollback rather than treating it as rolled back. A retry timeout may be configured by the application to avoid unnecessary retry in real heuristic scenarios.

WLS JTA recover process can be enhanced to rerun the recovery for a period of time based on a configured value specified by the application. This will give Oracle RAC some time to synchronize its pending transactions across the RAC cluster and make WLS JTA recovery process really run through.

Embodiments may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, Rams, EPROM's, EPROM's, Drams, Rams, flash memory devices, magnetic or optical cards, Nan systems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A computer-based server system comprising:
at least one server instance interacting with a number of database instances, the at least one server instance having an associated retry period for situations when a connection with a first database instance fails in an transaction and a connection is made to finish the transaction at a second database instance, the associated retry period being used to ensure that the most recent status information for the transaction has been sent from the first database instance to the second database instance;
wherein the at least one server instance is implemented using at least one processor and at least one memory; and
wherein a rollback at the second database instance is repeated within the retry period when a response from the second database instance may indicate that the second database instance may have not been updated with the most recent status information.

2. The computer-based server system of claim 1, wherein the transaction is an two phase commit transaction.

3. The computer-based server system of claim 1, wherein the transaction is an XA transaction.

4. The computer-based server system of claim 1, wherein the transaction is finished by a commit to the second database instance.

5. The computer-based server system of claim 4, wherein the commit at the second database instance is repeated within the retry period when a response from the second database instance may indicate that the second database instance may have not been updated with the most recent status information.

6. The computer-based server system of claim 1, wherein the transaction is finished by a rollback to the second database instance.

7. The computer-based server system of claim 6, wherein the rollback at the second database instance is repeated within the retry period when a response from the second database instance may indicate that the second database instance may have not been updated with the most recent status information.

8. The computer-based server system of claim 1, wherein the transaction is finished by a log request to the second database instance for a recover.

9. The computer-based server system of claim 8, wherein the log request to the second database instance is repeated within the retry period.

10. The computer-based server system of claim 9, wherein the retry period is configurable by an application.

11. A computer readable storage medium containing code to implement at least one server instance; the at least one server instance being such that:
at least one server instance interacting with a number of database instances, the at least one server instance having an associated retry period for situations when a connection with a first database instance fails in an transaction and a connection is made to finish the transaction at a second database instance, the associated retry period being used to ensure that the most recent status information for the transaction has been sent from the first database instance to the second database instance;

wherein a rollback at the second database instance is repeated within the retry period when a response from the second database instance may indicate that the second database instance may have not been updated with the most recent status information.

12. A computer readable storage medium of claim 1, wherein the at least one server instance being such that wherein the transaction is an XA transaction.

13. A computer readable storage medium of claim 1 wherein the at least one server instance being such that wherein the transaction is finished by a commit to the second database instance.

14. A computer readable storage medium of claim 1 wherein the at least one server instance being such that wherein the transaction is finished by a commit to the second database instance.

15. A computer readable storage medium of claim 1 wherein the at least one server instance being such that wherein the commit at the second database instance is repeated within the retry period when a response from the second database instance may indicate that the second database instance may have not been updated with the most recent status information.

16. A computer readable storage medium of claim 1 wherein the at least one server instance being such that wherein the transaction is finished by a rollback to the second database instance.

17. A computer readable storage medium of claim 16 wherein the at least one server instance being such that wherein the rollback at the second database instance is repeated within the retry period when a response from the second database instance may indicate that the second database instance may have not been updated with the most recent status information.

18. A computer readable storage medium of claim 1 wherein the at least one server instance being such that wherein the transaction is finished by a log request to the second database instance for a recover.

19. A computer readable storage medium of claim 18 wherein the at least one server instance being such that wherein the log request to the second database instance is repeated within the retry period.

20. A computer readable storage medium of claim 19 wherein the at least one server instance being such that wherein the retry period is configurable by an application.

* * * * *

UNITED STATES PATENT AND TRADEMARK OFFICE
CERTIFICATE OF CORRECTION

PATENT NO. : 7,437,361 B2  Page 1 of 1
APPLICATION NO. : 11/105949
DATED : October 14, 2008
INVENTOR(S) : Luo It is certified that error appears in the above-identified patent and that said Letters Patent is hereby corrected as shown below:

On Title page, in field (75), in column 1, under "Inventors", line 1, delete "Bedmister," and insert -- Bedminster, --, therefor.

In column 2, line 1, delete "Each" and insert -- each --, therefor.

In column 3, line 44, delete "information." and insert -- information --, therefor.

In column 4, line 67, delete "roll back" and insert -- rollback --, therefor.

In column 5, line 11, delete "roll back" and insert -- rollback --, therefor,

In column 8, line 14, delete "roll back" and insert -- rollback --, therefor.

In column 10, line 26, in claim 2, delete "an two" and insert -- two --, therefor.

In column 11, line 6, in claim 12, delete "claim 1," and insert -- claim 11, --, therefor.

In column 11, line 9, in claim 13, delete "claim 1" and insert -- claim 11 --, therefor.

In column 11, line 13, in claim 14, delete "claim 1" and insert -- claim 11 --, therefor.

In column 11, line 17, in claim 15, delete "claim 1" and insert -- claim 11 --, therefor.

In column 12, line 1, in claim 16, delete "claim 1" and insert -- claim 11 --, therefor.

In column 12, line 12, in claim 18, delete "claim 1" and insert -- claim 11 --, therefor.

Signed and Sealed this

Tenth Day of August, 2010

David J. Kappos
*Director of the United States Patent and Trademark Office*